United States Patent [19]

Kaiser

[11] Patent Number: 4,884,452
[45] Date of Patent: Dec. 5, 1989

[54] PRESSURE MONITORING DEVICE ISOLATOR

[75] Inventor: Danny K. Kaiser, Three Rivers, Mich.

[73] Assignee: Delaware Capital Formation, Inc., Wilmington, Del.

[21] Appl. No.: 238,921

[22] Filed: Aug. 31, 1988

[51] Int. Cl.$^4$ .............................................. G01L 7/08
[52] U.S. Cl. ......................................... 73/730; 73/756
[58] Field of Search ................... 73/730, 756; 137/557

[56] References Cited

U.S. PATENT DOCUMENTS

| | | | |
|---|---|---|---|
| 1,797,591 | 3/1931 | Sartakoff | 73/756 |
| 1,867,698 | 7/1932 | Harris | 73/756 |
| 4,082,002 | 4/1978 | Baugh | 73/756 |
| 4,218,926 | 8/1980 | DeVisser | 73/730 |

*Primary Examiner*—Donald O. Woodiel
*Attorney, Agent, or Firm*—Flynn, Thiel, Boutell & Tanis

[57] ABSTRACT

A pressure monitoring device isolator includes an annular member axially interposable in a pipeline for measuring the pressure of fluid in the pipeline. The annular member has an annular sensing fluid chamber, for a pressure sensing fluid, and an annular seal member separating the annular chamber from a central pipeline fluid passage. An opening in the outer periphery of the annular member is adapted to receive a pressure monitoring device. A sensing fluid passage extends radially inward from the pressure monitoring device opening. The sensing fluid passage is of substantially smaller volume than the sensing fluid chamber and the pressure monitoring device opening. A valve passage extends in from the periphery of the annular member to the annular sensing fluid chamber, meeting the sensing fluid passage at an acute angle. The valve passage has radially outer, middle and inner portions of progressively smaller cross sectional area. The inner portion joins the middle portion at an outward facing valve seat. The sensing fluid passage opens into the outer portion of the valve passage, thus communicating with the sensing fluid chamber via the valve passage. A valve member is threaded into the outer portion of the valve passage and is adapted to seat against the valve seat to interrupt the communication of the sensing fluid passage with the sensing fluid chamber.

8 Claims, 2 Drawing Sheets

PRESSURE MONITORING DEVICE ISOLATOR

FIELD OF THE INVENTION

This invention relates to an improved pressure monitoring device isolator apparatus for use in measuring pipeline pressure of fluids (e.g. liquids) and, more particularly, to an improved pressure monitoring device isolator apparatus which is adapted to minimize the loss of pressure sensing fluid when the pressure monitoring device is removed from the apparatus.

BACKGROUND OF THE INVENTION

A prior pressure monitoring device isolator utilizes an intermediary sensing fluid (e.g. liquid) isolated from the fluid (e.g. liquid) in a pipeline, by a resilient pressure transmitting member. Since this isolating sensor does not expose the pressure monitoring device to the fluid being measured, it is quite useful when measuring the pressure of fluids which can be harmful to pressure monitoring devices. U.S. Pat. No. 4,218,926 discloses such an isolating pressure sensor.

Although such a system does isolate the pressure monitoring device from the pipeline fluid, it provides no isolation from the sensing fluid. The sensing fluid in such systems is housed in an annular chamber, one wall of which is a resilient pressure transmitting member. The sensor is attached to the pipeline so that the pipeline fluid pressure is exerted on the resilient member. However, the sensing fluid chamber within the sensor has only a finite volume. Therefore, when a pressure monitoring device is removed from the isolating sensor while the sensing fluid is under pressure of the pipeline fluid, the pressurized sensing fluid is exposed to atmospheric pressure and can spray out from the pressure monitoring device port. Sensing fluid, if lost in this manner, must be replaced, because without sufficient sensing fluid the isolating sensor is inoperable. Such replacement of sensing fluid is a costly inconvenience. These considerations are particularly true when the sensing fluid is noncompressible fluid such as a liquid. Thus, a device which can isolate the pressure monitoring device from the pressure applied to the sensing fluid, for the purpose of changing or maintaining the pressure monitoring device, is desirable.

A prior art device disclosed in U.S. Pat. No. 4,082,002 uses a valve stem movable in a valve bore to disconnect a pressure monitoring device passage from a pipeline. The pressure monitoring device passage is threaded partway to receive a pressure monitoring device. However, in contrast to the present invention, a plug of grease in the pressure monitoring device passage transmits pressure from the pipeline liquid to the pressure monitoring device. A grease passage, stoppered at its outer end adjacent the pressure monitoring device, acutely angles into the outer portion of the pressure monitoring device passage for injection of grease thereinto. The pressure monitoring device passage extends generally tangentially, of and is spaced radially outboard of the central pipeline liquid passage through the device. The valve bore extends from the outer periphery of the device radially inward toward the central pipeline liquid passage. The pressure monitoring device passage meets the valve bore at a 90° angle. The outer ends of the pressure monitoring device passage and valve bore are circumferentially remote, lying almost one fourth of the device perimeter apart. Substantial open space around the device is thus needed for operation of the valve and removal of the pressure monitoring device. This is especially a problem in crowded pipeline environments where access to the pressure monitoring device isolating apparatus is difficult.

Also, the pressure monitoring device passage in this prior art device is, relative to the present invention, of very great volume, since the length of the pressure monitoring device passage is nearly equal to one half the diameter of the entire device, and the pressure monitoring device passage is everywhere at least approximately one-half the diameter of the threaded pressure monitoring device receiving portion thereof. Thus, even when the valve is closed, removal of the pressure monitoring device allows a relatively large amount of liquid (or grease) to be lost due to spillage.

Also, the threaded valve bore of this prior art device is formed directly in the housing of the device. The valve stem then threads directly into the valve bore. Thus if any thread damage occurs due to use of the valve, the entire housing may require replacement.

Also, to seal against fluid leaks past the valve stem into the outer portion of the valve bore, the valve stem is surrounded by and moves axially through a packing gland which must be held fixedly in its position in the valve bore thereby adding to the complexity of the prior device.

Accordingly, the objects of this invention include provision of:

a pressure monitoring device isolator which avoids the limitations of the prior art discussed above and which is capable of isolating a pressure monitoring device from a supply of pressurized sensing fluid to enable removal and replacement of the pressure monitoring device without significant loss of sensing fluid;

a pressure monitoring device isolator as aforesaid that is conveniently accessible for pressure monitoring device replacement and valve actuation even in crowded pipeline environments;

a pressure monitoring device isolator, as aforesaid, which minimizes the volume of sensing fluid exposed to spillage during pressure monitoring device replacement;

a pressure monitoring device isolator, as aforesaid, having readily replaceable valve elements;

a pressure monitoring device isolator, as aforesaid, that provides a seal for the valve member which is both inexpensive and easily accessible and maintainable;

a pressure monitoring device isolator, as aforesaid, that is of simple, economical construction.

Other objects and purposes of the invention will be apparent to persons acquainted with apparatus of this general type upon reading the following specification and inspecting the accompanying drawings.

SUMMARY OF THE INVENTION

The objects and purposes of this invention are met by providing a pressure monitoring device isolator which includes an annular member axially interposable in a pipeline for measuring the pressure of fluid in the pipeline. The annular member has a central passage through which fluid in the pipeline passes. An opening in the outer periphery of the annular member is adapted to receive a pressure monitoring device. A small volume sensing passage extends inward in the annular member from the pressure monitoring device opening. A valve passage extends in from the periphery of the annular member, meeting the sensing fluid passage at an acute angle. The valve passage has a small volume inner portion responsive to pipeline pressure and an outward facing valve seat joining the sensing passage to the inner portion of the valve passage. A valve member is movable into the valve passage to seat against the valve seat and therewith to interrupt the application of pipeline pressure to the sensing passage.

DETAILED DESCRIPTION

Figure 1:
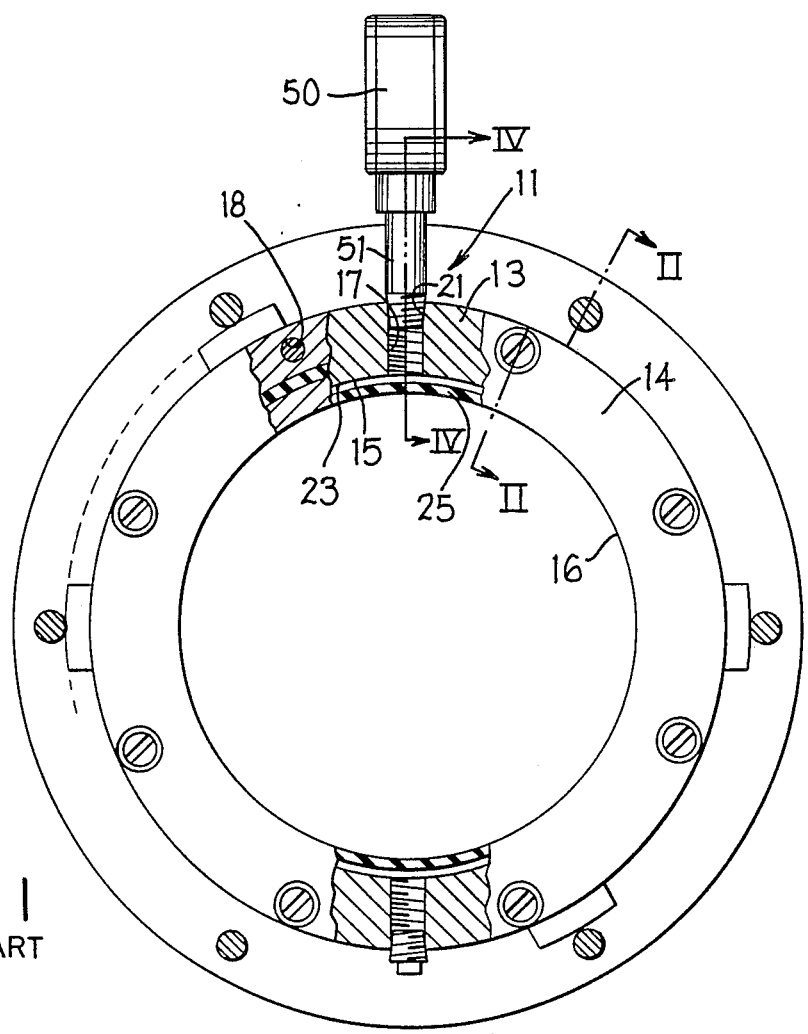
FIG. 1 is a partially broken view of a conventional pressure monitoring device isolator.
Figure 2:
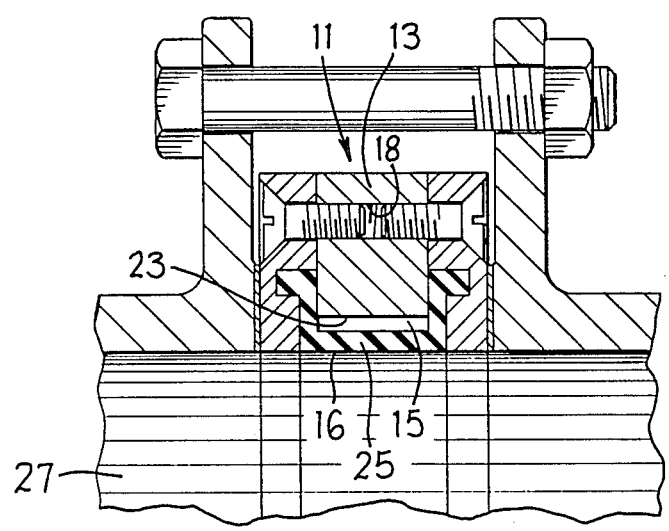
FIG. 2 is an enlarged fragmentary sectional view of the conventional pressure monitoring device isolator of FIG. 1.

FIGS. 1 and 2 disclose a conventional pressure monitoring device isolator 11. The pressure monitoring device isolator 11 comprises an annular member 13. Annular member 13 contains an annular sensing fluid chamber 15 and a sensing fluid passage 17 whose outer end defines a threaded pressure monitoring device opening 21 for receiving the input nipple 51 of a pressure monitoring device 50. The sensing fluid chamber 15 is bounded by a radially inner wall 23 of annular member 13 and a ring 25 of U-shaped cross-section, elastomeric material sealed to and spaced radially inward from wall 23.

The pressure of a fluid in pipeline 27 is applied to a sensing fluid (usually a liquid) in sensing fluid chamber 15 due to the resiliency of ring 25. Annular member 13 is formed by three coaxial ring members 14 fixed together by circumferentially distributed, axially distributed screws 18, which ring members clamp therebetween the axial ends of the elastomeric ring 25. The elastomeric ring 25 and ring members 14 define a central passage 16 through which pipeline fluid flows. Pressure in the pipeline 27, when applied to sensing fluid chamber 15, will force sensing fluid therefrom into sensing fluid passage 17 and cause pressure monitoring device 50 to read out such pressure. The FIGS. 1 and 2 pressure monitoring device isolator is disclosed in U.S. Pat. No. 4,218,926, which is assigned to the assignee of the present invention and the disclosure of which is incorporated herein by reference.

Turning now to the present invention (FIGS. 3–5), structural elements similar to those in FIGS. 1 and 2 are indicated by the same reference numerals with a prime mark (') added. The inventive structure of FIGS. 3–5 particularly differs from that above described with respect to FIGS. 1 and 2 as follows. The annular member 13' includes a valve passage 19 which extends in from the periphery of the annular member 13' to the sensing fluid chamber 15' at an acute angle to the sensing fluid passage 17', so as to intersect therewith as hereafter discussed.

The valve passage 19 has a radially inner portion 29, a middle portion 31 and an outer portion 35. The inner portion 29 opens into sensing fluid chamber 15'. The inner portion 29 joins the middle portion 31 of valve passage 19 at an outward facing valve seat 33. The middle portion 31 is tapered and expands continuously in diameter from valve seat 33 to the outer portion 35. The outer portion 35 of valve passage 19 is significantly larger in diameter than the inner portion 29.

An externally and internally threaded valve bushing 37 is threaded into the outer end of the outer portion 35 of valve passage 19 and has an enlarged head which seats against the outer periphery of the annular member 13'. A valve member 39 has a threaded outer shaft 41 threadedly adjustably received in the valve bushing 37.

The valve member 39 has a radially enlarged head 43 fixed coaxially on the inner end of shaft 41 and disposed inward of the inner end of the valve bushing 37. The head 43 coaxially opposes and is tapered more sharply than the tapered middle portion of the valve passage 19. The outer end of the shaft 41 is contoured to receive a tool for threading it axially along the valve bushing 37. In the embodiment shown, the outer end 47 of shaft 41 is diametrally slotted to receive a screwdriver. The axial distance from the inner end of the valve bushing 37 to the valve seat 33 substantially exceeds the axial length of the head 43 so that the latter can be either spaced from or abut the seat 33. The valve member 39 has an annular groove in its head 43 which receives an O-ring 35 to prevent fluid leakage outward beyond the head 43 along valve passage 19. Air leakage between the threads of the shaft 41 and bushing 37 keeps the air pressure between the head 43 and bushing 37 at atmospheric pressure to avoid air leakage inward past the O-ring 35. The valve member 39 can be moved along the valve passage 19 by applying a screw driver to the slotted outer end 47 of valve member 39, in order to seat the head 43 of valve member 39 against valve seat 33 and thereby interrupt fluid communication between the inner portion 29 and middle portion 31 of valve passage 19 or in order to unseat the valve head 43.

Figure 4:
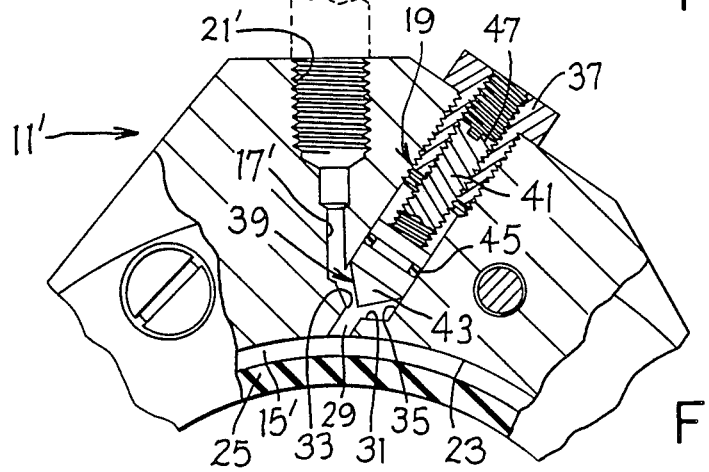
FIG. 4 is a view generally similar to FIG. 3 but showing the pressure monitoring device isolator in a different position of operation.

Referring to FIG. 4, the threaded pressure monitoring device opening 21' is normally filled by the threaded end 51 of a pressure monitoring device 50. The sensing fluid passage 17', extending inward from the pressure monitoring device opening 21', is of greatly reduced diameter from opening 21' and of greatly reduced volume from the fluid passage 17 of prior art FIG. 1. In fact, in a pressure monitoring device isolator built according to the present invention, the fluid passage 17' had a 0.125 inch diameter, and the ratio of volumes of prior art passage 17 to present invention passage 17' is approximately 9 to 1.

The inner end of sensing fluid passage 17' connects, not directly to the chamber 15' as in FIG. 1, but rather to the inner end of the outer portion 35 of the valve passage 19 immediately adjacent middle portion 31.

Turning now to the operation of the apparatus, when the head 43 of valve member 39 is not seated (FIG. 4) on valve seat 33, the sensing fluid passage 17' communicates with sensing fluid chamber 15' via the outer portion 35, middle portion 31 and inner portion 29 of valve passage 19, thus allowing the pressurized sensing fluid from chamber 15' to reach threaded pressure monitoring device opening 21' and the pressure monitoring device therein. On the other hand, when head 43 is seated (FIG. 3) on valve seat 33, fluid communication between sensing fluid passage 17' and sensing fluid chamber 15' is interrupted. The sensing fluid passage 17' and threaded pressure monitoring device opening 21' are then isolated from the pipeline pressure exerted on sensing fluid chamber 15', and the pressure monitoring device 50 can be safely removed from the pressure monitoring device opening 21'.

Since pipeline pressure cannot then drive sensing liquid in the sensing fluid chamber 15' out of the pressure monitoring device opening 21', loss of sensing liquid (which may be expensive and may be difficult to replace in chamber 15' without reducing pipeline pressure) and the danger of spurting of sensing liquid out of the pressure monitoring device opening 21' (which could splash on persons nearby) is avoided.

Also, due to the small diameter and volume of sensing fluid passage 17', only a very small portion of the total sensing liquid in the pressure monitoring device isolator 11' could possibly spill due to gravity if the isolator is tilted.

Figure 5:
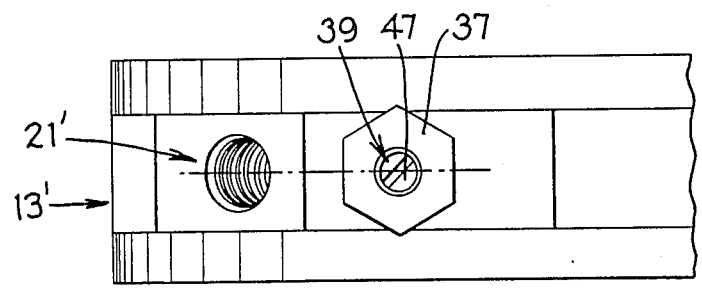
FIG. 5 is a view taken along the line V—V of FIG. 3.

The pressure monitoring device opening 21' and sensing fluid passage 17' define a fluid path extending from the periphery of annular member 13' radially inward. The valve passage 19 is circumferentially near and extends inward from the periphery of annular member 13' to join the sensing fluid passage 17' at a small acute angle, typically between about 30° to 40°. In the embodiment shown, the annular member 13' is radially extended, as indicated at 60, in the region of the threaded pressure monitoring device opening 21', to allow the threaded pressure monitoring device opening 21' and valve passage 19 to fit circumferentially loosely between adjacent screws 18'. Referring to FIG. 5, this circumferential nearness facilitates exchanging pressure monitoring devices on the annular member 13'. Both pressure monitoring device opening 21' and slotted end 47 of valve member 39 can be easily accessed at one circumferentially narrow zone on annular member 13'.

Figure 3:
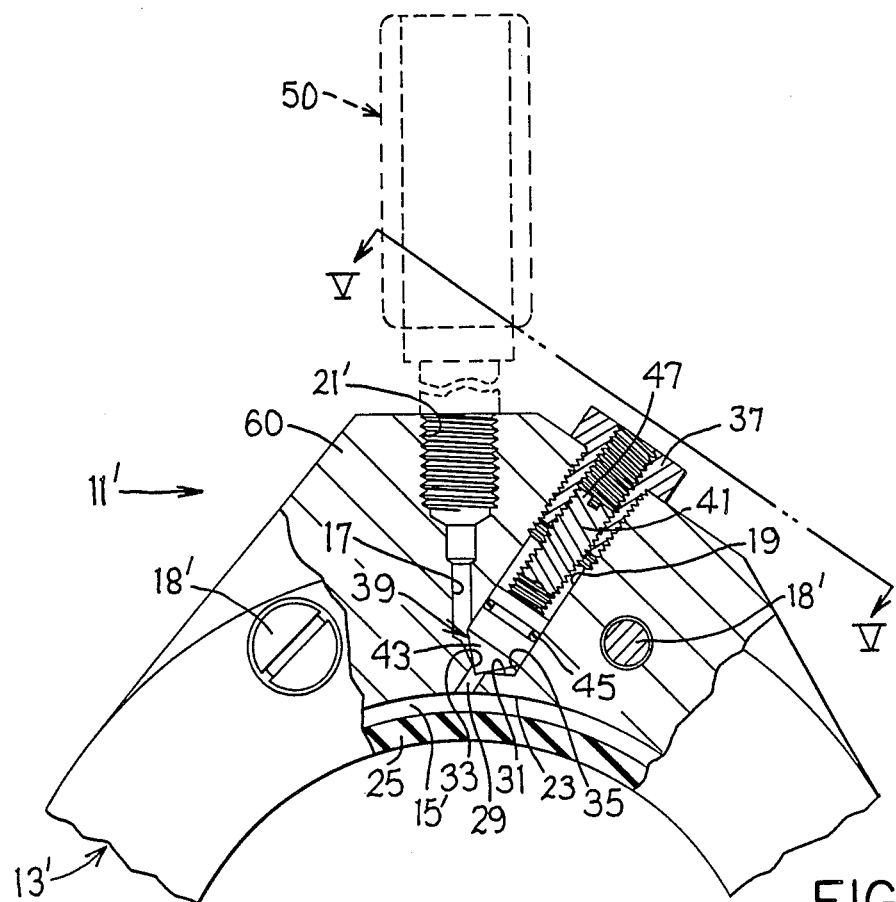
FIG. 3 is a partially broken, fragmentary elevational view of a pressure monitoring device isolator embodying the invention.

In summary then, and referring to FIGS. 3 and 4, the valve member 39 can be inward threaded by rotating its slotted end 47 to interrupt fluid communication between sensing fluid chamber 15' and sensing fluid passage 17', thereby isolating pressure monitoring device opening 21' from the pressure in sensing fluid chamber 15'. A pressure monitoring device can then be safely removed for repair or replacement. When the new or repaired pressure monitoring device is replaced in pressure monitoring device opening 21', the slotted end 47 of valve member 39 can be rotated reversely to restore fluid communication between sensing fluid chamber 15' and sensing fluid passage 17', thereby re-exposing pressure monitoring device opening 21' to pressurized sensing fluid.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A pressure monitoring device isolator for a pressure sensor capable of measuring the pressures of fluid in a pipeline, comprising:
an annular member axially interposable in the pipeline for measuring the pressure of fluid in the pipeline, the annular member having a central passage through which fluid in the pipeline passes;
an annular sensing fluid chamber and an annular seal member separating said sensing fluid chamber from said central passage, said annular sensing fluid chamber being surrounded by said annular member and having sensing fluid therein;
an opening in the outer periphery of said annular member, said opening being adapted to receive a pressure monitoring device;
a sensing fluid passage extending radially inward in said annular member from the radially inner end of said opening;
means for preventing significant loss of sensing fluid through said opening when said pressure monitoring device is removed from said opening, even with said annular sensing fluid chamber subject to pressure from fluid in said pipeline, said means comprising a valve passage extending in from the periphery of said annular member to said annular sensing fluid chamber at an angle to said sensing fluid passage, said valve passage having radially outer, middle and inner portions, said inner portion being substantially smaller in cross-sectional area than said outer portion, said inner portion being joined to said middle portion at an outward facing valve seat, said inner portion of said valve passage opening into said annular sensing fluid chamber, said sensing fluid passage having a radially inner end opening into said outer portion of said valve passage, thereby allowing communication of said sensing fluid passage with said sensing fluid chamber through said valve passage;
a valve member adapted to seat against said valve seat, said valve member having a head sealable against said seat to thereby interrupt communication of said sensing fluid passage with said sensing fluid chamber; and
a seal ring located in an annular groove in said head of said valve member and slidably engaging the large diameter portion of said outer portion of said valve passage to prevent leakage of sensing liquid outward through said valve passage.

2. The device of claim 1 wherein the cross-sectional area of said middle portion increases continuously from said inner portion to said outer portion.

3. The device of claim 1 wherein said angle between said sensing fluid passage and said valve passage is between 30° and 40°.

4. The device of claim 1 in wherein said sensing fluid passage is of diameter and volume substantially less than that of said pressure monitoring device receiving opening, said pressure monitoring device receiving opening being sized to be substantially filled by a pressure monitoring device inserted therein, such that the volume available to be filled with sensing fluid, between said pressure monitoring device opening and valve member is minimized.

5. A pressure monitoring device isolator for a pressure sensor capable of measuring the pressures of fluid in a pipeline, comprising:
an annular member axially interposable in the pipeline for measuring the pressure of fluid in the pipeline, the annular member having a central passage through which fluid in the pipeline passes, said annular member having a radially outwardly projecting portion on its outer periphery;
an annular sensing fluid chamber of volume small compared to the pipeline and a flexible annular seal member separating said sensing fluid chamber from said central passage, said annular sensing fluid chamber being surrounded by said annular member and being filled with sensing fluid, the sensing fluid being isolated from contact with the pipeline fluid by said flexible annular seal member, said flexible annular seal member applying the pressure of the pipeline fluid to the sensing fluid;

an opening in the outer periphery of said annular member, said opening being adapted to receive a pressure monitoring device, said opening being in said outwardly projecting portion;

a sensing fluid passage extending radially inward in said annular member from the radially inner end of said opening;

means for connecting said sensing fluid passage to said annular sensing fluid chamber while preventing significant loss of sensing fluid from said annular chamber through said opening when said pressure monitoring device is removed from said opening, even with said annular sensing fluid chamber subject to pressure from fluid in said pipeline, said means comprising a valve passage extending nonradially in from the periphery of said annular member to said annular sensing fluid chamber at an acute angle to said sensing fluid passage, said valve passage having radially outer, middle and inner portions, said inner portion being substantially less than half the diameter of said outer portion, said inner portion being joined to said middle portion at an outward facing valve seat, said inner portion of said valve passage opening into said annular sensing fluid chamber, said sensing fluid passage having a radially inner end opening into said outer portion of said valve passage immediately outward of said middle portion, thereby allowing communication of said sensing fluid passage with said sensing fluid chamber through said valve passage, the inner portion of said valve passage being angled obtusely from said sensing fluid passage, the radially inner portion of said sensing fluid passage being substantially less than half the diameter of said outer portion of said valve passage;

a valve member threaded into said outer portion of said valve passage and adapted to seat against said valve seat, said valve member having a head sealable against said seat to thereby interrupt communication of said sensing fluid passage with said sensing fluid chamber, said sensing fluid passage being of substantially lesser volume than said chamber and said pressure monitoring device receiving opening;

whereby to minimize the part of said sensing fluid contained in the sensing fluid passage, between the closed valve member and a pressure monitoring device in said opening.

6. A pressure monitoring device isolator for a pressure sensor capable of measuring the pressures of fluid in a pipeline, comprising:

an annular member axially interposable in the pipeline for measuring the pressure of fluid in the pipeline, the annular member having a central passage through which fluid in the pipeline passes;

an annular sensing fluid chamber and an annular seal member separating said sensing fluid chamber from said central passage, said annular sensing fluid chamber being surrounded by said annular member and having sensing fluid therein;

an opening in the outer periphery of said annular member, said opening being adapted to receive a pressure monitoring device;

a sensing fluid passage extending radially inward in said annular member from the radially inner end of said opening;

means for preventing significant loss of sensing fluid through said opening when said pressure monitoring device is removed from said opening, even with said annular sensing fluid chamber subject to pressure from fluid in said pipeline, said means comprising a valve passage extending in from the periphery of said annular member to said annular sensing fluid chamber at an angle to said sensing fluid passage, said valve passage having radially outer, middle and inner portions, said inner portion being substantially smaller in cross-sectional area than said outer portion, said inner portion being joined to said middle portion at an outward facing valve seat, said inner portion of said valve passage opening into said annular sensing fluid chamber, said sensing fluid passage having a radially inner end opening into said outer portion of said valve passage, thereby allowing communication of said sensing fluid passage with said sensing fluid chamber through said valve passage;

a valve member adapted to seat against said valve seat, said valve member having a head sealable against said seat to thereby interrupt communication of said sensing fluid passage with said sensing fluid chamber, said preventing means including a valve bushing threaded in the outer extremity of said outer portion of said valve passage, said valve member having a reduced diameter shaft adjustably threaded in said valve bushing, said head being located inboard of said valve bushing and enlarged in diameter beyond the diameter of said shaft, said head being fixed to said shaft.

7. The device of claim 6 in which said valve bushing has an elongate internally and externally threaded shank extending into said valve passage and a radially enlarged and wrench engageable head abutting the peripheral surface of said annular member, said valve member shaft having an outer end contoured for engaging by a tool to threadedly rotate said valve member and thereby seat and unseat said head with respect to said valve seat, said bushing having an inner end defining an axial clearance with said valve member head to enable seating and unseating of the latter.

8. A pressure monitoring device isolator for a pressure sensor capable of measuring the pressures of fluid in a pipeline, comprising:

an annular member axially interposable in the pipeline for measuring the pressure of fluid in the pipeline, the annular member having a central passage through which fluid in the pipeline passes;

an annular sensing fluid chamber and an annular seal member separating said sensing fluid chamber from said central passage, said annular sensing fluid chamber being surrounded by said annular member and having sensing fluid therein;

an opening in the outer periphery of said annular member, said opening being adapted to receive a pressure monitoring device;

a sensing fluid passage extending radially inward in said annular member from the radially inner end of said opening;

means for preventing significant loss of sensing fluid through said opening when said pressure monitoring device is removed from said opening, even with said annular sensing fluid chamber subject to pressure from fluid in said pipeline, said means comprising a valve passage extending in from the periphery of said annular member to said annular sensing fluid chamber at an angle to said sensing fluid passage, said valve passage having radially outer, middle and inner portions, said inner portion being substantially smaller in cross-sectional area than said outer portion, said inner portion being joined to said middle portion at an outward facing valve seat, said inner portion of said valve passage opening into said annular sensing fluid chamber, said sensing fluid passage having a radially inner end opening into said outer portion of said valve passage, thereby allowing communication of said sensing fluid passage with said sensing fluid chamber through said valve passage;

a valve member adapted to seat against said valve seat, said valve member having a head sealable against said seat to thereby interrupt communication of said sensing fluid passage with said sensing fluid chamber, said head having an annular groove, and said valve member further including a seal ring housed in said groove and bearing slidably and sealingly against the surface of said valve passage to seal against leakage of sensing fluid outwardly therebeyond.

* * * * *